United States Patent [19]

Brown

[11] Patent Number: 5,166,115

[45] Date of Patent: Nov. 24, 1992

[54] POLYURETHANES

[76] Inventor: William R. Brown, 12113 Lake Sherwood Ave., S., Baton Rouge, La. 70816

[21] Appl. No.: 829,444

[22] Filed: Feb. 3, 1992

Related U.S. Application Data

[62] Division of Ser. No. 783,211, Oct. 28, 1991.

[51] Int. Cl.⁵ .................. C08G 18/02; C08G 18/18
[52] U.S. Cl. .................................... 521/110; 521/115; 521/163; 521/167
[58] Field of Search .............. 521/110, 115, 163, 167

[56] References Cited

U.S. PATENT DOCUMENTS

| | | | |
|---|---|---|---|
| 4,477,604 | 10/1984 | Oechsle, III | 528/61 |
| 4,520,186 | 5/1985 | Hess et al. | 528/68 |
| 4,595,742 | 6/1986 | Nelepa et al. | 528/164 |
| 4,631,298 | 12/1986 | Presswood | 521/163 |
| 5,059,634 | 10/1991 | Smith | 521/167 |

Primary Examiner—Morton Foelak

[57] ABSTRACT

Novel polyurethane-urea foams having superior tear and tensile strengths, elongation and load-bearing are prepared by reacting an alkylthio-substituted aromatic diamine in a mixture of polyols with an aromatic diisocyanate or aromatic diisocyanate prepolymer or mixtures thereof, having free NCO content of 0.1–50% by weight. These foams have good dynamic properties that make them attractive as cushioning materials.

1 Claim, No Drawings

POLYURETHANES

This application is a division of application Ser. No. 07/783,211, filed Oct. 28, 1991.

FIELD OF INVENTION

This invention relates to urethane-urea copolymeric foams and, more particularly, to low density molded polyurethane-urea foams having improved tear and tensile strengths, elongation and load-bearing properties.

BACKGROUND

It is known that polyurethane foams having usable properties can be made by reacting isocyanates with polyalkylene ether polyols blended with polymer polyols in which polymers such as styrene-acrylonitrile have been polymerized in situ. The properties of foams made in this manner are limited by their use of "cross-linking" and reinforcement from the copolymer. To increase properties through formulation changes in this type of foam, a lower molecular weight per cross-link or higher amounts of polymer must be used. Both of these methods increase the stiffness of the polymer which tends to make the foams harder and less flexible. While increasing certain properties such as tensile strength, these methods lower elongation and resilience. Therefore, to produce an increase in properties with this type of foam and not create excess hardness, it is necessary to use foams of higher density. Plasticizers can be added to the formulation which, if used in the correct amounts, can provide the desired softness. Unfortunately, large quantities of plasticizers are necessary to cause any significant diminution in hardness. Even the most compatible plasticizers bleed (exude) from these compositions at even modest concentrations. Properties are reduced ("fall off") with non-reactive diluents like plasticizers.

Polyurethane-urea foams in which an aromatic diamine has been added are also known. The incorporation of an aromatic diamine produces better properties without an increase in brittleness to the polymer, thus not creating the excess hardness and loss of elongation that an increase in cross-link density produces. However, previously known aromatic diamines that react slow enough to be used in a molded foam process are solids at ambient conditions and must be used at high temperatures during the foaming reaction making processing difficult.

OBJECT OF THE INVENTION

An object of the present invention is to provide polyurethane-urea foams having properties that make them useful in cushioning materials and the like.

A further object of the present invention is to provide processes for preparing polyurethane-urea foams of enhanced tear and tensile strengths, elongation and load-bearing at low density.

These and other objects are attained by the reaction of substituted aromatic diamine with an aromatic diisocyanate or blend of aromatic diisocyanates having a free —NCO content of 10–50% by weight.

DETAILED DESCRIPTION

The foam compositions of the present invention utilize as one of the components at least one alkylthio-substituted aromatic diamine. These are aryl diamines bearing at least one $C_1$ to $C_{12}$ linear or branched alkylthio group, e.g., methylthio, ethylthio, etc.

While various phenylenediamines can be used herein, the preferred alkylthio-substituted aromatic diamine of use in the present invention is illustrated by the blend of 80% 3,5-di(methylthio)-2,4-diaminotoluene and 20% 3,5-di(methylthio)-2,6-diaminotoluene; the blend of 80% 3-methylthio-2,4-diaminotoluene and 20% 3-methylthio-2,6-diaminotoluene; or 1,3,5-triethylthio-2,6-diaminotoluene. These diamines (admixed with, for example, a polyol, copolymer polyol, blowing agent, etc.) are reacted with the diisocyanate, diisocyanate prepolymer, or blend of diisocyanates as a pure or substantially pure compound containing not more than 5% by weight of impurities that are typically formed as by-products in the synthesis of these alkylthio-substituted diamines. The amount of these aromatic diamines employed is generally 0.5–10% by weight based on the weight of the blend of polyol and copolymer polyol used in a formulated system which is to be reacted with the diisocyanate, diisocyanate prepolymer or blend of diisocyanates at an equivalent ratio of 0.95 to 1.10 of isocyanate to isocyanate reactives.

The alkylthio-substituted aromatic diamine of use in the invention can be reacted with any of a wide variety of crude or pure organic polyisocyanates or mixtures thereof which are commonly employed in the preparation of polyurethane foams. Typical of such polyisocyanates are m-phenylene diisocyanate; 2,4-toluenediisocyanate; 2,6-toluenediisocyanate; naphthalene-1,5-diisocyanate, 4,4'-methylene-bis-(diphenylisocyanate); 1,3,5-benzenetriisocyanate; and polyarylpolyalkylene polyisocyanates such as polymethylenepolyphenylisocyanate. Isocyanates prepared by the phosgenation of the reaction product between aniline and formaldehyde having functionality of 2.0 or greater, generally 2.2 to about 3.5, are described in U.S. Pat. Nos. 2,683,730 and 3,362,979.

The preferred isocyanate component used in the present invention is toluene diisocyanate obtained as the undistilled toluene diamine phosgenation reaction product or a modified product thereof having a minor amount of a difunctional active hydrogen-containing compound incorporated therein, said product having a hydroxyl equivalent weight within the range of about 50 to 125. By undistilled toluenediamine phosgenation reaction product is meant the reaction product of a mixture of essentially 2,4- and 2,6-toluenediamines with phosgene from which product essentially all of the reaction solvent, if present during the phosgenation reaction, has been removed by distillation and from which none or up to a major portion of the toluene diisocyanate has been removed by distillation. Such products may contain up to 90 percent by weight of volatile aromatic polyisocyanate, i.e., aromatic polyisocyanate separable from the composition by distillation. Undistilled toluenediamine phosgenation reaction production of this class and modified products thereof are described in U.S. Pat. Nos. 3,316,286 and 3,341,462, respectively, the disclosures of which are incorporated herein by reference. If desired, the undistilled toluenediamine phosgenation products can be diluted with up to 85 percent by weight of distilled toluene diisocyanate or a mixture of the isomeric 2,4 and 2,6-toluenediisocyanate or a similar amount of the phosgenation reaction product of 4,4'-methylene-bis(dianiline). A small amount of polyol may be added to the diisocyanate to modify reactivity or viscosity.

Polymeric diisocyanates may also be used in place of all or some of the toluenediisocyanate. Preferably, such polymeric diisocyanate is the reaction product of 4,4'-bis(diphenylmethane)diisocyanate with a polyether polyol.

One of the polyol components preferred to be used in the process of the invention is a polyalkylene ether polyol, such as a tetrol, triol, diol or mixtures thereof, having a number average molecular weight between about 3,000 and 8,000, preferably between about 4,500 and 6,700, and generally having a hydroxyl number between about 25 and 100. Polyether polyols of this type are conventionally obtained by reaction of an alkylene oxide, for example, ethylene oxide, propylene oxide, butylene oxide, trimethylene oxide or a mixture of two or more thereof, with a polyhydric alcohol such as ethylene glycol, propylene glycol, glycerol, tetramethylene glycol, trimethylolpropane or mixtures thereof. The preferred polyol is a polyalkylene ether triol so that a strong flexible high resilient foam will be obtained.

Polyether polyols derived from 1,2-propylene oxide and mixtures of 1,2-propylene oxide and ethylene oxide contain a major proportion of secondary hydroxyl groups and only a minor proportion of the more reactive primary hydroxyl groups. The reactivity of the polyol can be enhanced by reacting such polyols containing essentially secondary hydroxyl groups with ethylene oxide, and thereby obtain a polyether polyol having an increased proportion of primary hydroxyl groups. Such polyols are known in the art as capped or tipped polyether polyols and are particularly suited for use in the process of the present invention.

The other polyol component of the polyurethane-urea foams of the present invention is a polymer-containing polyol, said polymer being made in situ in a polyol base similar to the polyols described above, the polymer being one of several reaction products of a condensation reaction such as that between styrene and acrylonitrile monomers to form a styrene-acrylonitrile copolymer. When made in this manner, the polymer is present as a suspension in the base polyol in the form of small particles which act as reinforcing "fillers" in the finished foam. Polymer polyols can be used, which are produced such that they generally have a hydroxyl number between 40 and 150. Such polyols are known in the art as polymer polyols or copolymer polyols and are particularly suited for use in the process of the present invention.

Mixtures of the polyalkylene ether polyol and polymer polyol can also be used in the foams of the present invention. The novel urethane structures of the present invention are prepared in the presence of a blowing agent which preferably comprises water, which by in situ reaction with the isocyanate component produces carbon dioxide. This carbon dioxide gas assists in the foaming step producing the cellular structure. This reaction also results in a small quantity of urea linkages which contributes cross-linking sites and thus adds strength and load-bearing properties to the urethane polymer. If desired, one or more other blowing agents, for example, methylene chloride, fluorocarbons, and the like, may be used in place of or in addition to water, primarily to provide lower density structures and a softer urethane product.

The amount of water can be varied within the range of about 1 to 10 percent based on the weight of the polyether polyol. The auxiliary or substitute blowing agent, if employed, can be likewise present in an amount of up to about 10 percent by weight based on the weight of the polyether polyol. The amount(s) of blowing agent(s) used will depend upon the characteristics, density, load bearing, etc., desired in the flexible structure being prepared.

Other compounds known as cell stabilizers can be added. These materials can be chosen from a group consisting of glycol amines to include monoethylene glycol, diethylene glycol, etc., and are employed in the range of about 1 to 4 percent by weight based on the weight of the polyether polyol. The use of compounds such as these is conventional practice and known in the art of the preparation of such foams.

Various reaction promotors in the form of catalysts or accelerators may be employed in the foam-forming reaction. Examples of compounds for use as accelerators or catalysts in polyurethane foam formation include conventional organometallic catalysts, such as dibutyltin dilaurate, stannous octoate, dibutyltin dioctoate, and tertiary amine catalysts, such as triethylamine, N-methylmorpholine, N-ethylmorpholine, triethylenediamine, N,N,N',N'-tetramethyl-1,3-butanediamine, and triethylaminoethylpiperazine, and catalysts comprising a mixture of such an amine with a tertiary amine salt of an alkylarylsulfonic acid, containing from about 9 to about 15 carbon atoms in the alkyl chain as is disclosed in Canadian Pat. No. 857,851, issued Dec. 1, 1970, the disclosure of which is incorporated herein by reference.

Other materials which may conventionally be employed in the production of polyurethane foams according to the present invention include stabilizers, particularly organosilicones commercially available for this purpose, fillers, flame retardants and pigments.

In general, the amount of the polyisocyanate component used is sufficient to provide from about 0.95 to about 1.10 isocyanate groups for each reactive hydroxyl or amine hydrogen present in the polyols, amines or water added to provide blowing action (generally referred to as A:B index). Preferably, the amount is such as to provide an equal amount of reactive sites or a slight excess of isocyanate reactive sites, e.g., an A:B index of about 1.00 to 1.05.

The process of the invention for manufacturing comprises blending the aromatic diamine, a polyether polyol, a polymer polyol, along with stabilizers, catalysts, and blowing agent(s), into a polyisocyanate at ambient conditions and heating the resulting blend to from about 100° F. (38° C.) to about 250° F. (121° C.), and preferably to from about 130° F. (54° C.) to 200° F. (93° C.), in a closed mold until a cured polyurethane foam is formed.

From about 1 to 12 percent, and preferably from about 2 to 6 percent, of the alkylthio-substituted aromatic diamine by weight of the polyol or polyol mixture is used, having the composition consisting essentially of about 20 to about 35 weight percent 3,5-di(methylthio)-2,6-diaminotoluene and about 80 to about 65 percent 3,5-di(methylthio)-2,4-diaminotoluene. Other compounds and mixtures mentioned herein may also be employed.

From about 1 to about 10 percent, and preferably from about 2 t-o about 8 percent, of a blowing agent based on the weight of polyether polyol is used. Water is preferably used as the blowing agent. From about 0.5 to about 2.5 percent, and preferably from about 1 to 2.0 percent, of a cell stabilizer, from about 0.8 to about 1.8 percent, and preferably from 1.0 to 1.6 percent, of an organosilicone stabilizer, and from about 0.4 to 2.5 percent, and preferably from about 0.6 to about 1.5 percent, of a promotor or mixture of promotors based on the weight of the polyether are used as previously discussed.

The blend is preferably mixed at ambient temperatures with high pressure impingement type mixing equipment at 1000 to 2500 psi component pressures or a mechanical mixer capable of mixing to the same extent. It is then cast in a closed mold at the previously discussed temperatures and allowed to rise and cure in the mold. Foams prepared in this manner may be removed from the mold from about 2 to 6 minutes after mixing depending upon the amount and type of promotors and mold temperatures used.

The novel polyurethane foams prepared according to the process of the present invention are characterized by having a tensile strength of at least 15 psi to about 40 psi, an elongation of at least 105 percent to about 175 percent, and a foam density of less than 35 pounds/ft$^3$, which properties evidence high quality foams suitable for use in applications in which prior art polyurethane foams were used.

It is preferred, however, that the foam density is from about 1.75 to about 35 pounds/ft$^3$, most preferably 1.7 to about 5.0 pounds/ft$^3$, and the tensile strength is from about 17 psi to about 30 psi and an elongation of about 110 percent to about 150 percent.

To further illustrate the present invention and the manner in which it may be practiced, the following specific examples are set forth. In the examples, unless otherwise indicated, all parts and percentages are by weight, and the foams were evaluated by art recognized procedures as indicated.

EXAMPLES

Example 1

Comparative Reactivity of Aromatic Diamines

In order to compare the relative reaction rates of various aromatic diamines, reaction mixtures were prepared using 4,4'-methylene-bis(cyclohexaneisocyanate) (DESMODUR ® W by Mobay Corporation) as the diisocyanate. Each aromatic diamine was added to the isocyanate at 74° F. (23° C.) in an amount to provide 1.00 equivalents of isocyanate per 1.00 equivalents of reactive primary amine hydrogen. The solution was mixed for 30 seconds by hand and the time to gelation was noted (gel-time). Gel-time is the time measured from the initiation of mixing to the time when the liquid reaction mixture will no longer flow under its own weight. The following Table I contains the results of these tests.

TABLE I

| REACTION RATES OF AROMATIC DIAMINES | |
|---|---|
| DIAMINE | GEL-TIME (min:sec) |
| A | 01:03 |
| B | 01:16 |
| C | 03:07 |
| D | 03:33 |
| E | 09:35 |
| F | 28:02 |
| G | >2 hours |
| H | >3 hours |

DIAMINES USED:
A. A blend comprised of 80% 3,5-diethyl-2,4-diaminotoluene and 20% 3,5-diethyl-2,6-diaminotoluene.
B. 1,3,5-triethyl-2,4-phenylenediamine.
C. The reaction product(s) of 1 mole of 2,6-diethylaniline and 1 mole of 2-ethyl-6-sec-butyl aniline with 1 mole of formaldehyde.
D. The reaction produce of 2 moles of 2-ethyl-6-sec-butyl-aniline with 1 mole of formaldehyde.
E. A blend of 80% 3-methylthio-2,4-diaminotoluene and 20% 3-methylthio-2,6-diaminotoluene.
F. A blend of 80% 3,5-dimethylthio-2,4-diaminotoluene and 20% 3,5-dimethylthio-2,6-diaminotoluene.
G. Methylene-bis-(orthochloroaniline).
H. 1,3,5-triethylthio-2,4-phenylenediamine.

EXAMPLE 2

Reaction Rate Characteristics in Free-rise Foams

The diamines in Example 1 were employed as foam components to make free rise foams.

The components of each formulation were mixed at 74° F. (23° C.) using a mechanical blade mixer turning at 12,000 rpm for 4 seconds at which time the reaction mixtures were poured into a second container also at 74° F. (23° C.) and were allowed to rise freely for observation. Formulations used and results are shown below in Table II.

TABLE II

| | FREE-RISE FOAM EVALUATIONS | | | | | | | | |
|---|---|---|---|---|---|---|---|---|---|
| | AMOUNT USED (PARTS/100/POLYOL) | | | | | | | | |
| | SAMPLE NO. | | | | | | | | |
| FORMULATIONS: | 1 | 2 | 3 | 4 | 5 | 6 | 7 | 8 | 9 |
| COMPONENTS | | | | | | | | | |
| Voranol 4703$^a$ | 50 | 50 | 50 | 50 | 50 | 50 | 50 | 50 | 50 |
| Voranol 4925$^b$ | 50 | 50 | 50 | 50 | 50 | 50 | 50 | 50 | 50 |
| Diethanolamine$^c$ | 1.5 | 1.5 | 1.5 | 1.5 | 1.5 | 1.5 | 1.5 | 1.5 | 1.5 |
| Water$^d$ | 4.0 | 4.0 | 4.0 | 4.0 | 4.0 | 4.0 | 4.0 | 4.0 | 4.0 |
| Niax Y-10184$^e$ | 1.2 | 1.2 | 1.2 | 1.2 | 1.2 | 1.2 | 1.2 | 1.2 | 1.2 |
| Dabco 33LV$^f$ | 0.55 | 0.55 | 0.55 | 0.55 | 0.55 | 0.55 | 0.55 | 0.55 | 0.55 |
| Niax A-1$^g$ | 0.15 | 0.15 | 0.15 | 0.15 | 0.15 | 0.15 | 0.15 | 0.15 | 0.15 |
| Diamine A | — | 2.5 | — | — | — | — | — | — | — |
| Diamine B | — | — | 2.5 | — | — | — | — | — | — |
| Diamine C | — | — | — | 2.5 | — | — | — | — | — |
| Diamine D | — | — | — | — | 2.5 | — | — | — | — |
| Diamine E | — | — | — | — | — | 2.5 | — | — | — |
| Diamine F | — | — | — | — | — | — | 2.5 | — | — |
| Diamine G | — | — | — | — | — | — | — | 2.5 | — |
| Diamine H | — | — | — | — | — | — | — | — | 2.5 |
| Mondur TD-80$^h$ (used at a 1.00 A:B index) | 47.1 | 49.5 | 49.3 | 48.2 | 48.1 | 49.2 | 49.1 | ** | 48.6 |
| REACTION TIMES (min:sec) | | | | | | | | | |
| Cream Time$^1$ | 0:07 | <0:04 | <0:04 | <0:04 | 0:04 | 0:06 | 0:07 | ** | 0:07 |
| String Time$^2$ | 0:43 | <0:20 | <0:20 | <0:20 | 0:24 | 0:42 | 0:38 | ** | 0:53 |

TABLE II-continued

FREE-RISE FOAM EVALUATIONS
AMOUNT USED (PARTS/100/POLYOL)

| FORMULATIONS: | SAMPLE NO. | | | | | | | | |
|---|---|---|---|---|---|---|---|---|---|
| | 1 | 2 | 3 | 4 | 5 | 6 | 7 | 8 | 9 |
| Rise Time[3] | 1:12 | — | — | — | — | 0:59 | 1:18 | ** | 1:34 |
| Foam Condition | Good | Poor* | Poor* | Poor* | Poor* | Good | Good | ** | Good |

*Foam shrank and collapsed due to premature polymer gelation.
**Solid diamine would not stay in solution at ambient temperature; foam was not made.
[a] A polyalkylene ether triol, Dow Chemical Company.
[b] A polymer polymer, Dow Chemical Company.
[c] Diethanolamine, a cell stabilizer, Texaco Chemical Company.
[d] Used as the blowing agent.
[e] An organosilicone stabilizer, Union Carbide Corporation.
[f] 33% triethylenediamine dissolved in dipropylene glycol, Air Products and Chemicals.
[g] A tertiary amine catalyst, Union Carbide Corporation.
[h] A blend of 80% 2,4-toluenediisocyanate and 20% 2,6-toluenediisocyanate.
[1] The time measured from mix initiation to when the reaction liquid begins to turn "creamy" due to the generation of carbon dioxide gas.
[2] The time measured from mix initiation to when, by touching the top of the rising foam with an object and pulling the object away, a string is produced.
[3] The time measured from mix initiation to when the foaming reaction mixture ceases to rise.

EXAMPLE 3

Molded Foam Physical Property Comparisons

The formulations which had produced stable foams in Example 2 were used to produce molded foams. All of the components except the diisocyanate were blended together in the right amounts prior to reacting. An aluminum mold with a suitable mold release applied to the surfaces was preheated to 140° F. (60° C.). The diisocyanate was added to the blend of components and was mixed for 5 seconds on a mechanical blade mixer at 12,000 rpm. The reaction mixture was then added to the mold and the mold was clamped shut. After 2 minutes, the mold was placed in an oven at 140° F. (60° C.) to keep it at the same temperature. After 8 minutes, the mold was removed from the oven and the resultant foams were removed from the mold. The foams were immediately mechanically crushed to insure a high open-cell content. The foams were aged for 7 days at 77° F. (25° C.) and 50% relative humidity before sample parts were cut and physical property testing took place. The results from this testing are shown in Table III.

TABLE III

RESULTS OF PHYSICAL PROPERTY TESTING OF MOLDED FOAMS

| PROPERTY | SAMPLE NO. (as in Example 2) | | | | ASTM D-3574 TEST METHOD |
|---|---|---|---|---|---|
| Section | 1 | 6 | 7 | 9 | |
| Density, pcf | 1.90 | 1.93 | 1.89 | 1.92 | A |
| Tear Strength, pli | 1.62 | 1.74 | 1.78 | 1.67 | F |
| Tensile Strength, psi | 18.7 | 18.7 | 20.7 | 19.0 | E |
| Elongation, % | 99 | 100 | 108 | 101 | E |
| 25% IFD, psi | 22 | 29 | 29 | 28 | B1 |
| 65% IFD, psi | 63 | 87 | 87 | 78 | B1 |

I claim:

1. A flexible, low density polyurethane-foam composition having improved tear and tensile strengths, elongation and load-bearing comprising the reaction product of an aromatic diisocyanate or aromatic diisocyanate prepolymer with a mixture of:
   (a) 3,5-di(methylthio)-2,6-diaminotoluene, 3,5-di(methylthio)-2,4-diaminotoluene 1,3 methylthio-2,6-diaminotoluene and 1,3,5-triethylthio-2,6 diaminotoluene admixtures as the sole diamines, said alkylthio substituted aromatic diamines having a suitable reaction rate in the foaming process;
   (b) at least one polyol selected from a group consisting of polyalkene ether polyol, polymer polyol and mixtures thereof;
   (c) a blowing agent or mixtures of blowing agents;
   (d) a glycol amine cell stabilizer selected from the group consisting of monoethanol amine and diethanol amine,
   (e) an organosilicone stabilizer; and
   (f) a reaction promotor or mixtures thereof selected from a group of conventional organometallic, tertiary amine and tertiary amine salt catalysts.

* * * * *